(12) United States Patent
Dowlatkhah et al.

(10) Patent No.: US 12,010,115 B2
(45) Date of Patent: *Jun. 11, 2024

(54) BIOMETRICS HUB FOR CHANGING A SCHEDULE FOR PROCESSING BIOMETRICS DATA IN RESPONSE TO DETECTING A POWER EVENT

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,637

(22) Filed: Jun. 13, 2022

(65) Prior Publication Data

US 2022/0311765 A1  Sep. 29, 2022

Related U.S. Application Data

(63) Continuation of application No. 16/866,450, filed on May 4, 2020, now Pat. No. 11,363,016, which is a (Continued)

(51) Int. Cl.
*G06F 21/32* (2013.01)
*G06F 1/30* (2006.01)
(Continued)

(52) U.S. Cl.
CPC ............ *H04L 63/0861* (2013.01); *G06F 1/30* (2013.01); *G06F 1/3206* (2013.01);
(Continued)

(58) Field of Classification Search
CPC ...... G06F 1/30; G06F 1/3206; G06F 11/3006; G06F 11/2007; G06F 21/32;
(Continued)

(56) References Cited

U.S. PATENT DOCUMENTS 6,336,900 B1  1/2002 Alleckson et al.
6,389,464 B1  5/2002 Krishnamurthy et al.
(Continued)

FOREIGN PATENT DOCUMENTS

| EP | 1968699 B1 | 4/2010 |
|---|---|---|
| WO | 2016118979 A9 | 7/2016 |
| WO | 2016201033 A1 | 12/2016 |

OTHER PUBLICATIONS

Hyeong gon Jo et al., "Proximity-Based Asynchronous Messaging Platform for Location-Based Internet of Things Service," International Journal of Geo-Information, 5, 116; doi:10.3390/ijgi5070116 ISPRS Int. (2016). pp. 1-15. https://pdfs.semanticscholar.org/b77e/cffaa98528b5296a659bc2028a8550ada9a2.pdf?_ga=2.203211794.2084968285.1501709110-1735636521.1501189277.

(Continued)

*Primary Examiner* — Izunna Okeke (57) ABSTRACT

A biometrics hub may establish a session with a first biometric device, receive first biometric data of a user from the first biometric device, establish a session with a second biometric device, receive second biometric data of the user from the second biometric device, and store the first biometric data and the second biometric data at the biometrics hub. The biometrics hub may further detect a power event associated with at least one of the first biometric device or the second biometric device, and change, in response to detecting the power event, a schedule for processing at least one of the first biometric data or the second biometric data.

20 Claims, 4 Drawing Sheets

Related U.S. Application Data continuation of application No. 15/457,865, filed on Mar. 13, 2017, now Pat. No. 10,645,080.

(51) Int. Cl.
*G06F 1/3206* (2019.01)
*G06F 11/20* (2006.01)
*G06F 11/30* (2006.01)
*H04L 9/40* (2022.01)
*H04L 29/06* (2006.01)

(52) U.S. Cl.
CPC ...... *G06F 11/2007* (2013.01); *G06F 11/2015* (2013.01); *G06F 11/3006* (2013.01); *G06F 11/3013* (2013.01); *G06F 11/3062* (2013.01); *G06F 21/32* (2013.01); *G06F 2201/85* (2013.01)

(58) Field of Classification Search
CPC ............. G06F 11/3013; G06F 11/3062; G06F 11/2015; G06F 2201/85; H04L 63/0861
See application file for complete search history.

(56) References Cited

U.S. PATENT DOCUMENTS

| | | | |
|---|---|---|---|
| 6,712,762 B1 | 3/2004 | Lichter et al. | |
| 6,773,396 B2 | 8/2004 | Flach et al. | |
| 6,826,607 B1 | 11/2004 | Gelvin et al. | |
| 7,263,102 B2 | 8/2007 | Kreiner et al. | |
| 7,457,834 B2 | 11/2008 | Jung et al. | |
| 7,480,724 B2 | 1/2009 | Zimler et al. | |
| 7,688,952 B2 | 3/2010 | Light et al. | |
| 8,126,729 B2 | 2/2012 | Dicks et al. | |
| 8,395,498 B2 | 3/2013 | Gaskill et al. | |
| 8,475,368 B2 | 7/2013 | Tran et al. | |
| 8,666,488 B2 | 3/2014 | Duke | |
| 9,035,568 B2 | 5/2015 | Ganton et al. | |
| 9,418,263 B2 | 8/2016 | Butler et al. | |
| 9,436,270 B2 | 9/2016 | Pitigoi-Aron et al. | |
| 2006/0253894 A1 | 11/2006 | Bookman et al. | |
| 2008/0059239 A1 | 3/2008 | Gerst et al. | |
| 2012/0182143 A1* | 7/2012 | Gaines | A61B 5/0022 340/539.12 |
| 2013/0201316 A1 | 8/2013 | Binder et al. | |
| 2013/0278414 A1 | 10/2013 | Sprigg et al. | |
| 2014/0088393 A1* | 3/2014 | Bernstein | G16H 50/20 600/365 |
| 2014/0167928 A1 | 6/2014 | Burd et al. | |
| 2015/0309492 A1 | 10/2015 | Patel et al. | |
| 2016/0105424 A1 | 4/2016 | Logue et al. | |
| 2017/0026472 A1 | 1/2017 | Bugenhagen et al. | |

OTHER PUBLICATIONS

MobileCloudEra., "Qualcomm and Medical Cloud Platforms." Mar. 20, 2013. 2 Pages. https://mobilecloudera.com/qualcomm-and-medical-mobile-cloud-platforms/.
"Parallax Health Management", parallaxhealthsciences.com, (2015) 2 Pages. https://www.parallaxhealthsciences.com/qolpom.
Roberto Ascione, "Medical grade biometric monitoring, on the go", Jul. 14, 2016. 3 Pages. http://www.healthwareinternational.com/blogspot/medical-grade-biometric-monitoring-on-the-go-484.
Health@home Hubs, lampreynetworks.com. Sep. 15, 2015. 3 Pages. http://web.archive.org/web/20150915001851/http://lampreynetworks.com/solutions/healthhome-hubs/.

* cited by examiner

BIOMETRICS HUB FOR CHANGING A SCHEDULE FOR PROCESSING BIOMETRICS DATA IN RESPONSE TO DETECTING A POWER EVENT

This application is a continuation of U.S. patent application Ser. No. 16/866,450, filed May 4, 2020, now U.S. Pat. No. 11,363,016, which is a continuation of U.S. patent application Ser. No. 15/457,865, filed Mar. 13, 2017, now U.S. Pat. No. 10,645,080, both of which are herein incorporated by reference in their entirety.

The present disclosure relates generally to secure real time communications for medical and healthcare applications, and more particularly to devices, computer-readable media and methods for changing a schedule for processing biometrics data in response to detecting a power event and/or for transmitting biometrics data to an authorized remote device in accordance with a schedule.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for changing a schedule for processing biometrics data in response to detecting a power event. For instance, in one example, a processor of a biometrics hub may establish a session with a first biometric device, receive first biometric data of a user from the first biometric device, establish a session with a second biometric device, receive second biometric data of the user from the second biometric device, and store the first biometric data and the second biometric data at the biometrics hub. The processor may further detect a power event associated with at least one of the first biometric device or the second biometric device, and change, in response to detecting the power event, a schedule for processing at least one of the first biometric data or the second biometric data.

The present disclosure also broadly discloses devices, computer-readable media, and methods for transmitting biometrics data to an authorized remote device in accordance with a schedule. For instance, in one example, a processor of a biometrics hub may establish a first schedule for processing first biometric data of a user, establish a second schedule for processing second biometric data of the user, storing the first biometric data that is received from a first biometric device via a first persistent session, and store the second biometric data that is received from a second biometric device via a second persistent session. The processor may further transmit at least one of the first biometric data or the second biometric data to an authorized remote device in accordance with the first schedule or the second schedule. In one example, the transmitting includes establishing a session with the authorized remote device, sending the at least one of the first biometric data or the second biometric data to the authorized remote device via the session with the authorized remote device, and closing the session with the authorized remote device.

Currently numerous manufacturers provide smart biometric devices that are either placed around a premises or comprise wearable devices such as a heartrate monitor, a hypoglycemic alarm, a pedometer, etc. At a customer premises, these devices connect to separate routers, usually from same manufacturer, and/or to a smart mobile endpoint device that a user carries. However, these solutions are susceptible to loss of Internet service provider (ISP) connection, loss of power to the premises, router failure, or other problems. In any case, these issues could lead to loss of valuable data transmitted by the biometric devices or losing the connection and the ability to interact with the biometric devices.

Loss of connection to an ISP or loss of power could go unnoticed and specifically in emergency cases could have a life threatening effect on the user and lead to major reliability issues with healthcare and insurance agencies. Furthermore, biometric devices and manufacturers' ecosystems are often simplified from a service offering point of view. For instance, for each reading and/or interaction with a complex service offering (Internet Protocol (IP) Multimedia Subsystem (IMS) services, for example), a session may need to be reestablished with the carrier and moved to active status to transmit data. Once the service is completed, the device may change status to idle mode, which may cause increased power consumption and general complexity in any given device. In many cases, different biometric device manufacturers use different protocols for biometric devices to communicate with routers and outside world. These biometric devices are either connected through Wi-Fi, cellular radios or some other method of communication.

In accordance with the present disclosure, various biometric devices may be connected to a personalized biometrics hub. If the radio or ISP connections of one or more biometric devices fail, the personalized biometrics hub may act as a backup method of communication and may send a warning message to a local ISP, a third-party power company, or a healthcare provider regarding the possible service failure, while keeping a line of communication open with the outside world. In particular, in one example, the personalized biometrics hub stores the data from the biometric devices as a private cloud storage. In one example, the personalized biometrics hub may also offer power back up to some biometric devices, e.g., those which are more critical to a user and/or which do not have their own sources of power. The personalized biometrics hub may also, in case of a low power warning for any given biometric device, change the power usage profile and reduce the power consumption by taking over the transmission of information and reducing the interval of interaction with the outside world. In other words, the personalized biometrics hub may change a schedule for processing the biometrics data from any biometrics device, which may include changing the type of power source or the mode of communication (which may affect a quantity of power consumed).

In one example, the personalized biometrics hub maintains always-on sessions with biometric devices. Thus, a biometric device avoids having to establish a new session every time the biometric device is ready to send biometric data. The biometric device may simply send the biometric data when it is ready via the open connection with the personalized biometrics hub. The personalized biometrics hub provides several functions or features for local device management. For instance, the personalized biometrics hub may communicate with diverse types of biometric devices regardless of the manufacturer and protocol(s) used. This can be accomplished by talking directly to a biometric device and/or its proprietary bridge/gateway as a secondary/redundant point of contact. The personalized biometrics hub may also include a protocol converter for third-party applications (e.g., a collection of drivers) which enables the personalized biometrics hub to communicate with any manufacturer's biometric devices. The personalized biometrics hub may include a cellular and/or Wi-Fi module that can communicate with the carrier network and become and a redundant/backup connection to a telecommunication network and/or the cloud. The personalized biometrics hub may also access and install any drivers to enable communication with a biometric device for which it does not presently possess a driver. The personalized biometrics hub may also provide local storage of biometric data from various biometric devices. Thus, the personalized biometrics hub may have the ability to store generated biometric data from connected biometric devices and communicate information to remote devices on demand with push and notify capabilities. In some cases, the quantities of data stored, the duration of time over which the data is stored, and so forth, is related to the data policy management and power management functions described below.

In particular, the personalized biometrics hub may also provide local device management. For example, the personalized biometrics hub may control biometric devices both in general and in case of emergency (e.g., during and/or in response to power events) and provide local storage of biometric data measured by the biometric devices. The local device management may include data policy management. For instance, the personalized biometrics hub may establish schedules for processing the biometric data from biometric devices, and may alter the type and amount of data being collected from biometric devices on the premises depending upon user preferences, based upon instructions from authorized remote devices which subscribe to receive the biometric data, and/or based upon a service provider's policy that can be managed by a policy management subsystem. The personalized biometrics hub may negotiate schedules for processing the biometric data, which may determine whether and for how long to store biometric data, when the send the biometric data to the authorized remote device(s), the quantities of biometric data to send to the remote device(s), how long to leave a connection open with a remote device, the mode of communication to use to transmit the biometric data, a primary mode of communication, one or more secondary/backup modes of communication, and so forth.

The local device management may also include power management. For instance, the personalized biometrics hub may manages power usage of various connected biometric devices. For example, to conserve power the personalized biometrics hub may alter the schedule for processing biometric data from a biometric device, such as reducing the frequency and/or duration of communications with a biometric device if a biometric device power level falls below a certain level. In the case of a power outage, the personalized biometrics hub can notify the user or notify an entity that receives the biometric data and/or a related healthcare entity about the power outage (broadly "authorized remote devices"), while reducing the power consumption of the biometric device(s) and saving the gathered biometric data. In some cases, the data policy management and the power management functions of the biometrics hub may overlap.

The foregoing describes various aspects of a biometrics hub primarily with respect to functions relating to the management of local connected biometrics devices. In accordance with the present disclosure, a personalized biometrics hub may also provide several functions relating to interactions with authorized remote devices. For example, in accordance with the present disclosure, network communication-capable biometric devices should be able to communicate with an authorized remote device, such as a healthcare provider server, via a telecommunication network's service layer. The authorized remote device should be able to render any services, regardless of intricacy and complexity, to a user. Service platforms such as IMS, complicated security protocols such Web-Real Time Communication (WebRTC), and even Transmission Control Protocol (TCP) and/or TCP/IP may require protocol stacks in biometric devices and require having a session active with constant communication with an authorized remote device to keep a session active. This may result in additional power consumption, complicated device management and communication modules, as well as added costs to all devices connected to the network. Additionally, there may be problems with session continuity as well difficulties in moving to a 5G network model with separate control and user planes. On the other hand, many biometrics devices are not IP enabled and even fewer may have the ability to communicate with a cellular network. This can be detrimental when physicians and other healthcare-related entities seek to access biometrics data from biometric devices at a customer premises, such as electrocardiogram (EKG) readings for the last hour, blood sugar measurements for the last 24 hours, and so on. Typically, the healthcare-related entities may access the biometric devices through proprietary gateways provided by the manufacturers of the biometric devices. However, a computing device of a healthcare-related entity receiving the biometric data may not have a standardized interface from patient to patient.

In examples of the present disclosure, various biometric devices may use different communication protocols to communicate gathered data with authorized remote devices. In addition, the various biometric devices may utilized different modes of communication, such as a wireless or a wired connection, a cellular connection, and so forth. There may be various producers of such biometric devices, and in some cases the biometric devices may include intelligence and an ability to communicate with third-party service providers. In other cases, the biometric devices may generally communicate only through a dedicated getaway with a basic level of communication. The use of multiple different protocols and data formats prevents service providers from offering rich and open communication capabilities. In addition, the inclusion of added capabilities in some biometric devices, such as a cellular module, the possible requirement to keep a session active for certain IMS services, and other factors may result in added power usage.

In accordance with the present disclosure, a personalized biometrics hub freely communicates with all diverse types of biometric devices through a protocol converter that can discover the biometric devices at a customer premises and instantiate sessions with the biometric devices. The personalized biometrics hub can download the protocol stack (standard or proprietary) through the personalized biometrics hub's network connection(s) to enable the personalized biometrics hub to communicate with each biometric device. Once a session is established with a biometric device, the personalized biometrics hub may become an anchor for all the services that seek to communicate with a biometric device or access biometric data from a given biometric device, regardless of the method of communication or the protocol stack that is used to deliver services. Thus, biometric devices may be deployed as "thin clients" with a minimum of components to maintain communication with the personalized biometrics hub. Biometric devices with enhanced capabilities and communication modules may consume less power by disabling or minimizing the use of such features.

From a third party service provider's perspective, the personalized biometrics hub and a thin client (i.e., a biometric device) appear as one entity. In one example, the personalized biometrics hub has the ability to control biometric device power utilization by controlling the frequency and duration of communications, and may also communicate with authorized remote devices, such as computing devices of third-party healthcare-related entities, regarding the status(es) of biometric devices. The personalized biometrics hub may also store biometric data and other information received from various biometric devices for future recovery and statistical purposes. In particular, the personalized biometrics hub may provide local storage (e.g., at the user/customer premises) of biometric data for third-parties, either as a primary source of the biometric data or a backup source in case a biometric device, or a primary network connection of a biometric device, fails.

In one example, the personalized biometrics hub provides data policy management for authorized remote devices/third-party devices, and may negotiate the types of data the third-parties want to access, how often to provide data, how much data to provide, how much data to store, the mode(s) of communication to use to transmit the data to the authorized remote devices, and so forth. In one example, the data policy management may include receiving schedules for processing biometrics data of one or more biometrics devices, negotiating such schedules, and storing and transmitting biometrics data to the authorized remote devices in accordance with such schedules. The personalized biometrics hub also communicates with local biometric devices to obtain the biometric data. For instance, the personalized biometrics hub may act as a pass-through and provide biometric data from a biometric device to an authorized remote device as it is generated. In another example, the personalized biometrics hub may provide local storage for the third-party requestor and/or authorized remote device if real-time biometrics data is not needed. For example, the third-party may request that an authorized remote device receive biometric data only during overnight hours so that bandwidth during the day is reserved for employees within an office, while machine-to-machine data that is not time critical may flow when the office is empty. Thus, in one example, the personalized biometrics hub is tasked with establishing and tearing down sessions with authorized remote devices for conveying biometric data, while the biometric devices may simply have an always-on, persistent connection with the personalized biometrics hub and do not need to incur the extra power consumption of establishing and tearing down sessions each time there is biometric data to send.

In addition, in one example, the personalized biometrics hub may inform third parties of problems at the customer premises with one or more biometric devices, such as a power failure of a particular device, a general loss of power at the premises, a loss of connectivity via a primary mode of communication, and so forth. In one example, the personalized biometrics hub may receive instructions from third-parties for various purposes, such as to shut down non-essential biometric devices, while maintaining reduced-power consumption data feeds from other biometric devices that are more critical and/or to change a schedule for processing biometrics data from one or more biometrics devices. For example, a change in schedule may cause the biometrics hub to: store more or less biometrics data from one or more biometrics devices, change a mode of communication for transmitting the biometric data, instruct one or more biometrics devices to transmit more or less biometrics data, instruct one or more biometrics devices to reduce a frequency of measurement sampling, and so on. In another example, the biometrics hub may take an automated action to change a schedule for processing biometrics data from one or more biometrics devices and may notify one or more authorized remote devices of the schedule change. These and other aspects of the present disclosure are discussed in greater detail below in connection with the examples of FIGS. 1-4.

Figure 1:
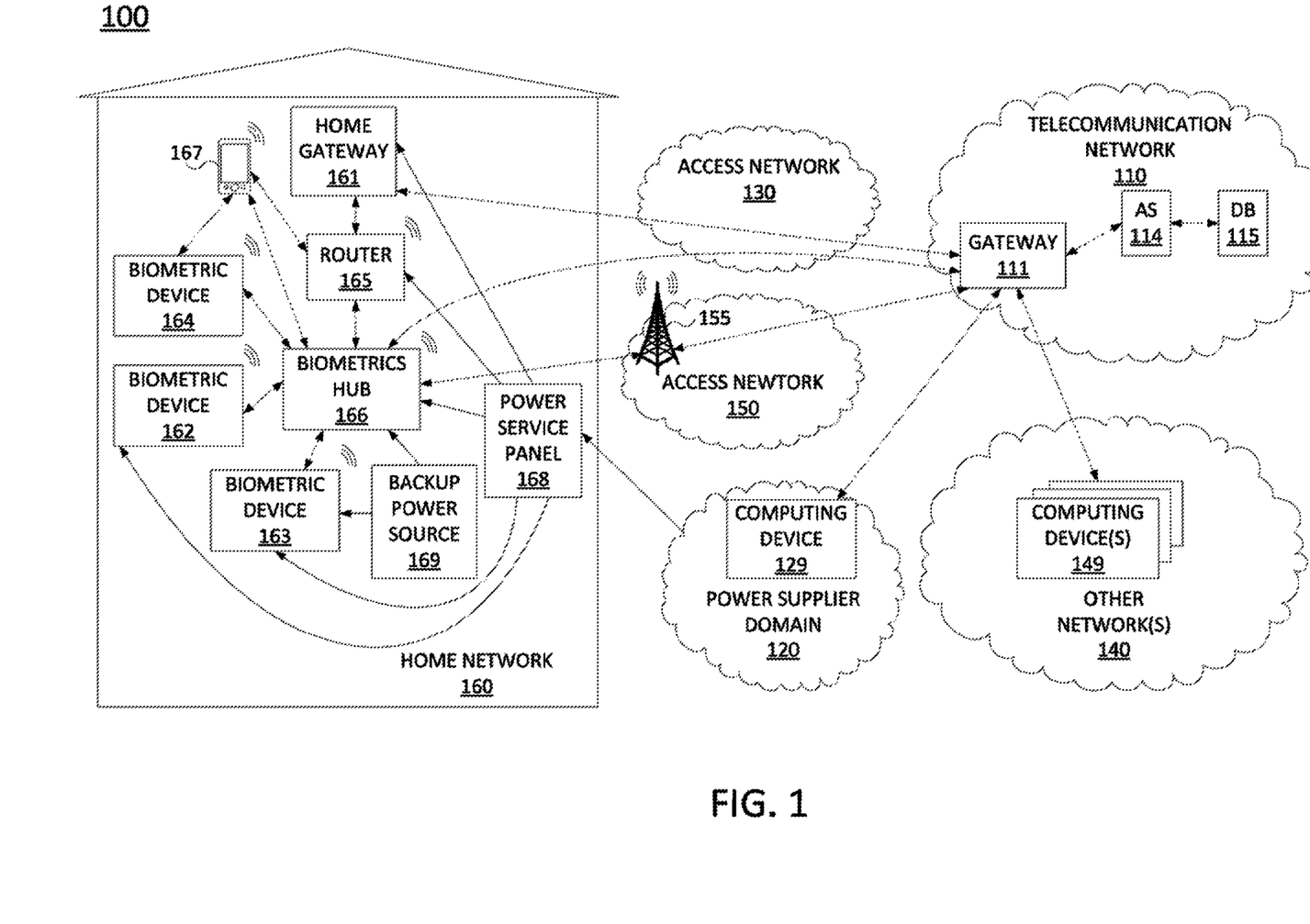
FIG. 1 illustrates an example system related to the present disclosure.

To better understand the present disclosure, FIG. 1 illustrates an example network, or system 100 that may implement examples of the present disclosure for changing a schedule for processing biometrics data in response to detecting a power event and/or for transmitting biometrics data to an authorized remote device in accordance with a schedule. In one example, the system 100 includes a telecommunication network 110. As illustrated in FIG. 1, the telecommunication network 110 may combine core network components of a cellular network with components of a triple play service network, where triple play services include telephone services, Internet services and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. For example, telecommunication network 110 may include a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. In one example, telecommunication network 110 may include cellular core network components, e.g., components of a Long Term Evolution (LTE) Evolved Packet Core (EPC), such as a Home Subscriber Server/Home Location Register (HSS/HLR) for tracking cellular subscriber device location and other functions, a mobility management entity (MME) a serving gateway (SGW), a packet data network gateway (PGW, or PDN-GW), an authentication, authorization, and/or accounting (AAA) server, and so forth.

As illustrated in FIG. 1, telecommunication network 110 includes a gateway 111, an application server 114 and a database 115, e.g., a data storage device/server, a cluster of servers for data storage, etc. Application server 114 may provide a healthcare-related service to one or more user/subscribers of telecommunication network 110, such as monitoring and anticipating strokes, detecting seizures, falls, or disorientation, notifying medical professionals, family members, or other caregivers of such conditions, and so forth. In one example, database 115 may receive and store biometrics data, e.g., for archiving, for periodic access by AS 114 to generate reports, charts, or other healthcare-related visualizations for a user associated with biometric devices 162-164 and/or for medical professionals, insurance companies, caregivers, and/or other authorized third parties, and so on. In one example, gateway 111 may facilitate communications between biometrics hub 166 and/or biometric devices 162-164 in home network 160 and one or more authorized remote devices, such as AS 114 and/or DB 115, computing devices 149 in other networks 140, and so forth in connection with examples of the present disclosure for changing a schedule for processing biometrics data in response to detecting a power event and/or for transmitting biometrics data to an authorized remote device in accordance with a schedule. In one example, gateway 111 may comprise a PDN gateway, or a device connected to a PDN gateway through which all communications to and from biometrics hub 166 and/or biometric devices 162-164 may be routed.

Telecommunication network 110 may also further comprise a broadcast television network, e.g., a traditional cable provider network or an Internet Protocol Television (IPTV) network, as well as an Internet Service Provider (ISP) network. With respect to television service provider functions, telecommunication network 110 may include one or more television servers (not shown) for the delivery of television content, e.g., a broadcast server, a cable head-end, interactive TV/video-on-demand (VOD) server(s), advertising/television commercial servers, and so forth. For example, telecommunication network 110 may comprise a video super hub office, a video hub office and/or a service office/central office. For ease of illustration, various elements of telecommunication network 110 are omitted from FIG. 1.

In one example, the access network 130 may comprise a Digital Subscriber Line (DSL) network, a broadband cable access network, a Local Area Network (LAN), a $3^{rd}$ party network, and the like. For example, the operator of telecommunication network 110 may provide a cable television service, an IPTV service, or any other type of television service to subscribers via access network 120. In this regard, access network 130 may include a node, e.g., a mini-fiber node (MFN), a video-ready access device (VRAD) or the like. However, in another example, such a node may be omitted, e.g., for fiber-to-the-premises (FTTP) installations. Access network 130 may also transmit and receive communications between home network 160 and telecommunication network 110 relating to voice telephone calls, communications with computing devices 149 via other networks 140, and/or the Internet in general, and so forth. In another example, access network 130 may be operated by a different entity from telecommunication network 110, e.g., an Internet service provider (ISP) network.

In one embodiment, access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative example, wireless access network 150 is shown as an evolved UMTS terrestrial radio access network (eUTRAN) subsystem. Thus, element 155 may comprise a Node B or evolved Node B (eNodeB). In one example, wireless access network 150 may be controlled and/or operated by a same entity as core network 110.

In one example, home network 160 may include a home gateway 161, which receives data/communications associated with different types of media, e.g., television, phone, and Internet, and separates these communications for the appropriate devices. The data/communications may be received via access network 130. In one example, television data is forwarded to set-top boxes (STBs)/digital video recorders (DVRs) to be decoded, recorded, and/or forwarded to televisions in the home for presentation. Similarly, telephone data is sent to and received from a home phone, while Internet/data communications are sent to and received from router 165, which may be capable of both wired and/or wireless communication. In turn, router 165 receives data from and sends data to the appropriate devices, e.g., a personal computer or laptop computer, mobile endpoint device 167, and so forth. The mobile endpoint device 167 may comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device"). In one example, the mobile endpoint device 167 may comprise a device of a subscriber or customer of the telecommunication network 110. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 2:
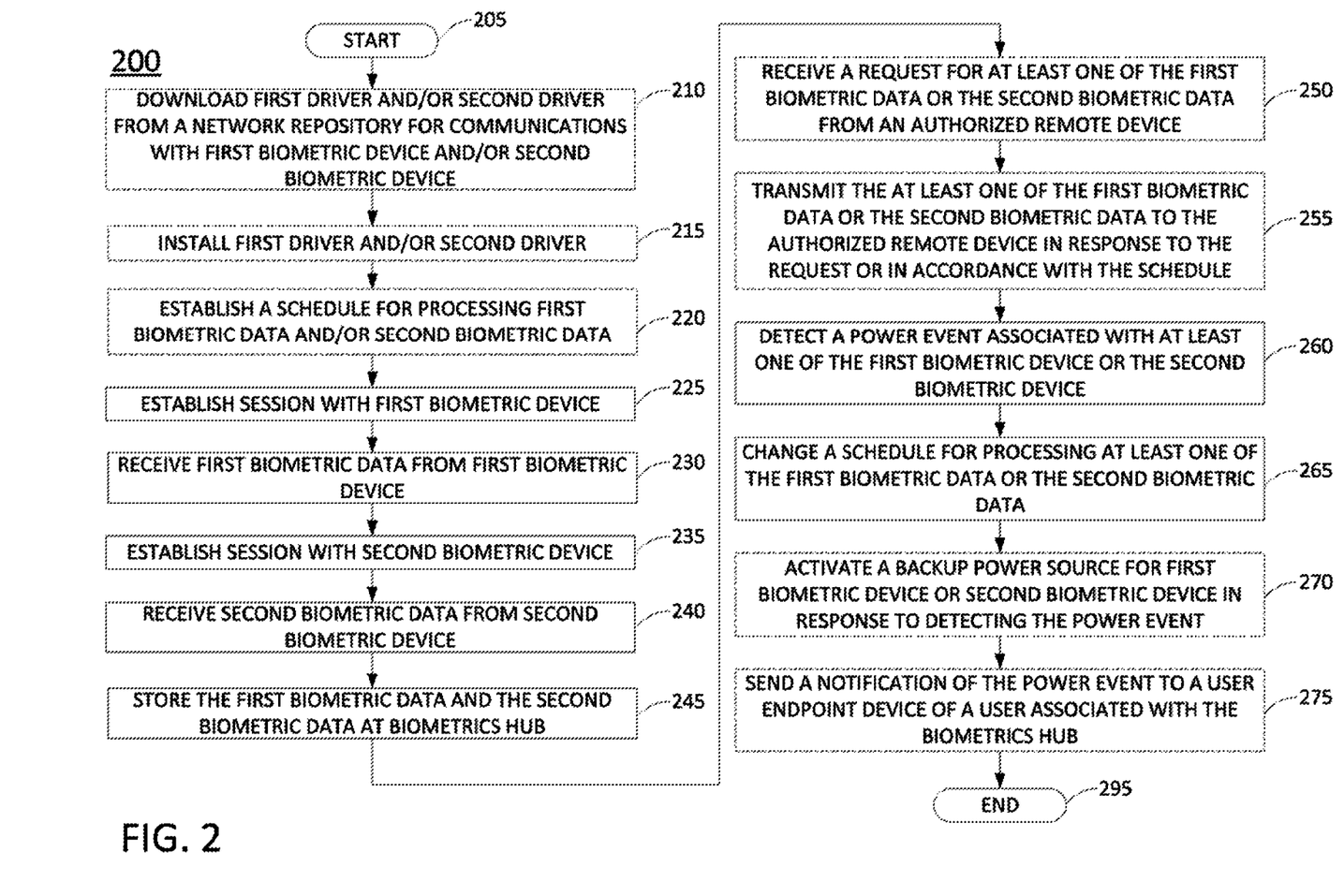
FIG. 2 illustrates a flowchart of an example method for changing a schedule for processing biometrics data in response to detecting a power event.
Figure 3:
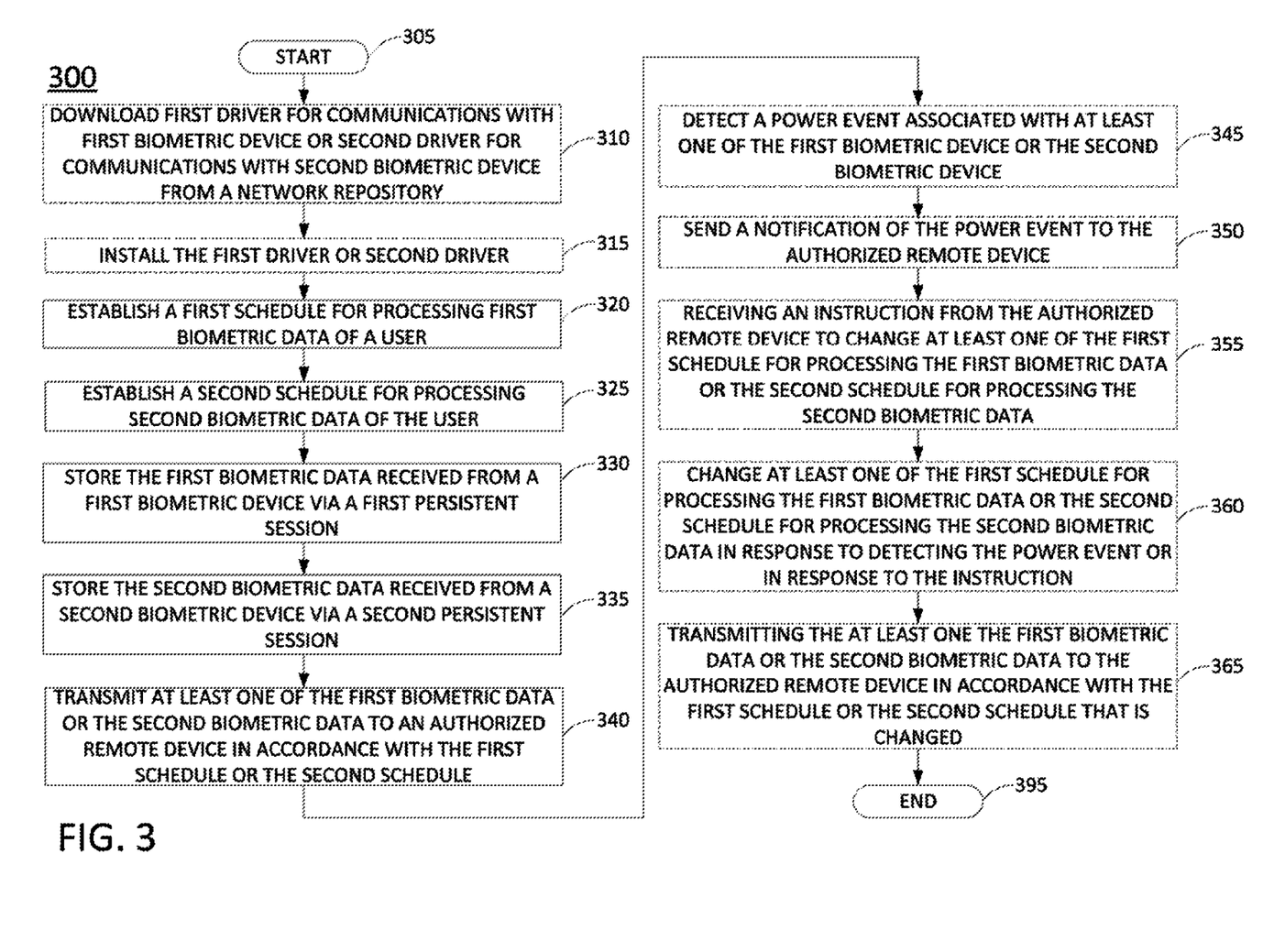
FIG. 3 illustrates a flowchart of an example method for transmitting biometrics data to an authorized remote device in accordance with a schedule.

As illustrated in FIG. 1, home network 160 may also include a biometrics hub 166 and biometrics devices 162-163. In one example, the biometrics hub 166 may comprise a device, such as the computing device or system 400 depicted in FIG. 4, specifically configured to provide one or more functions for changing a schedule for processing biometrics data in response to detecting a power event and/or for transmitting biometrics data to an authorized remote device in accordance with a schedule, in accordance with the present disclosure. For instance, an example method 200 for changing a schedule for processing biometrics data in response to detecting a power event is illustrated in FIG. 2 and described in greater detail below. In addition, an example method 300 for transmitting biometrics data to an authorized remote device in accordance with a schedule is illustrated in FIG. 3 and described in greater detail below. As used herein, the terms "instantiate," "configure," and "reconfigure" may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth. In accordance with the present disclosure, biometrics hub 166 may include antenna(s), radios/transceivers and/or other modules for both cellular communication and non-cellular wireless communication (e.g., IEEE 802.11). Thus, biometrics hub 166 may have a first mode of communication via router 165

(e.g., a Wi-Fi mode, or a wired local area network (LAN) connection mode, such as a wired Ethernet link) as well as a second mode of communication (e.g., a cellular mode) via element 155 in access network 150, e.g., an eNodeB.

Biometric devices 162-164 may comprise wearable units, devices connected to a body of a user, e.g., a user of mobile endpoint device 167, or devices which are not specifically connected to the body of the user, but which nevertheless measure physical parameters of the user (broadly "biometric data"), such as: a heartrate, a breathing rate, a blood oxygen concentration, a blood sugar level, an electrocardiogram pattern, a pupil dilation, an activity level, skin conductance and/or sweat/skin moisture levels, a body temperature, an activity level, a voice pitch and tone, and so forth. The biometric devices 162-164 may comprise, for example: heart rate monitors, electrocardiogram devices, acoustic sensors, sensors for measuring users' breathing rates, galvanic skin response (GSR) devices, portable electroencephalography (EEG) devices, event-related potential (ERP) measurement devices, diffuse optical tomography (DOT) scanners, and so forth. The biometrics hub 166 and/or the mobile endpoint device 167 may be in communication with biometric devices 162-164 via wired connections, such as universal serial bus (USB) connections, high-definition multimedia interface (HDMI) connections, wired Ethernet connections, or the like, or via wireless connections, such as a via infrared transmitters or transceivers, radios/transceivers for IEEE 802.11 based communications (e.g., "Wi-Fi"), IEEE 802.15 based communications (e.g., "Bluetooth", "ZigBee", etc.), and so forth.

As illustrated in FIG. 1, home network 160 also includes a power service panel 168, which may receive electrical power from a power distribution network, e.g., power supplier domain 120. In this regard, it should be noted that power supplier domain 120 may include power distribution infrastructure, as well as enterprise computing components, which may include a computing device 129, e.g., a server, for managing communications with devices in home network 160 and/or in telecommunication network 110 regarding power events that may relate to the power supplier domain 120 and which may affect the collection, storage, and or transmission of biometric data from home network 160. For example, computing device 129 may send messages to biometrics hub 166 regarding an anticipated loss of power to the premises of home network 160.

In one example, the power service panel 168 receives and distributes electrical power from power supplier domain 120 to devices in the home network such as biometrics hub 166, router 165, home gateway 161, biometric device 162, and biometric device 163. In one example, home network 160 also include a backup power source 169, such as battery, a generator, a solar panel or solar array, and so forth. In the example of FIG. 1, the backup power source 169 may be connected to the biometrics hub 166 and biometric device 163. For example, biometric device 163 may measure biometric data of a user that is deemed to be of greater importance than the biometric data measured by biometric device 162. Thus, in the event of a loss of power from the power supplier domain 120, the use of the backup power source 169 may be reserved for the biometrics hub 166 and biometric device 163 to enable the biometric data from biometric device 163 to continue to flow to one or more authorized remote devices. In addition, the backup power source 169 may allow biometrics hub 166 to send notifications to computing device 129 regarding a loss of power at the premises of home network 160. For example, biometrics hub 166 may use a built-in cellular transceiver to communicate with computing device 129 via element 155 (e.g., an eNodeB) in access network 150 and via telecommunication network 110, after other devices in home network 160, such as router 165 and home gateway 161 fail due to a loss of power from power supplier domain 120.

In one example, other networks 140 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 140 may include different types of networks. In another example, the other networks 140 may be the same type of network. In one example, the other networks 140 may represent the Internet in general. Computing devices 149 may include servers, such as web servers, storage devices, enterprise servers, email servers, and so forth. Computing devices 149 may also include personal computers, desktop computers, laptop computers, personal digital assistants (PDAs), tablet computing devices, or any other devices for wireless and/or wired communications. In one example, biometrics hub 166, mobile endpoint device 167, and/or any one or more of biometric devices 162-164 may communicate with computing devices 149 in other networks 140 via gateway 111 and telecommunication network 110. In one example, computing devices 149 may comprise servers for healthcare-related applications, such as a secure database server and/or secure streaming server for storing biometrics data, a server for remotely monitoring biometric devices and/or a patient associated with the biometric devices, or a computing device of a doctor, a hospital, an insurance company, and so forth. In one example, computing devices 149 may comprise authorized remote devices, i.e., devices which are permitted to receive biometrics data from any one or more of biometric devices 162-164, to change schedules for processing biometric data from any one or more of biometric devices 162-164, or to otherwise interact with biometrics hub 166 and/or biometric devices 162-164. In one example, AS 114 and/or DB 115 may also comprise an authorized remote device, in accordance with the present disclosure.

In one example, communications to and from biometrics hub 166 and biometrics devices 162-164 with authorized remote devices may all be routed through gateway 111. In one example, the gateway 111 may be reached by devices in home network 160 via different modes of communication, e.g., via Wi-Fi through router 165, home gateway 161, and access network 130, via a separate dedicated connection between biometrics hub 166 and access network 130, via a cellular connection over access network 150, and so forth. In one example, biometrics hub 166 establishes and maintains secure sessions with biometric devices 162-164. The secure sessions may comprise persistent sessions whereby biometric devices 162-164 may send biometric data as it is collected/generated, or when the biometric devices 162-164 are scheduled to transmit the biometric data according to schedule(s) for processing the biometric data. In other words, the biometric devices 162-164 and/or the biometrics hub 166 do not need to establish/reestablish sessions prior to transmitting and receiving the biometric data. In one example, biometrics hub 166 may store biometric data and transmit biometric data to authorized remote devices via gateway 111 according to one or more schedules for processing the biometric data. In one example, biometrics hub 166 establishes a secure connection to gateway 111, e.g., an Evolved Packet System (EPS) bearer, further establishes a secure tunnel to an authorized remote device using the secure connection to gateway 111, transmits biometrics data, and tears down the secure tunnel to the authorized remote device and/or the secure connection to gateway 111. These features of biometrics hub 166 may be provided according to one or more schedules for processing biometrics data, as described herein.

It should be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. In addition, various elements of power supplier domain 120, access networks 130 and 150, other networks 140, and telecommunication network 110 may be omitted for clarity, including gateways or border elements providing connectivity between such networks. Similarly, due to the relatively large number of connections available between devices in the system 100, various links between various components of system 100 are also omitted for clarity.

In addition, although aspects of the present disclosure have been discussed above in the context of a long term evolution (LTE)-based cellular architecture, examples of the present disclosure are not so limited. For example, the teachings of the present disclosure can be applied to other types of cellular networks (e.g., a 2G network, a 3G network, and the like, or a future technology or standard-based network). For instance, examples of the present disclosure may implement packet data protocol (PDP) contexts for devices accessing data services through a gateway General Packet Radio Service (GPRS) support node (GGSN) instead of an EPS bearer associated with a PDN gateway. Thus, these and other modifications are all contemplated within the scope of the present disclosure.

FIG. 2 illustrates a flowchart of an example method 200 for changing a schedule for processing biometrics data in response to detecting a power event, in accordance with the present disclosure. In one example, steps, functions and/or operations of the method 200 may be performed by a biometrics hub, e.g., biometrics hub 166 in FIG. 1, or biometrics hub 166 in conjunction with other components of the system 100, such as gateway 111, and so forth. In one example, the steps, functions, or operations of method 200 may be performed by a computing device or system 400, and/or processor 402 as described in connection with FIG. 4 below. For example, the system 400 may represent a biometrics hub in accordance with the present disclosure. For illustrative purposes, the method 200 is described in greater detail below in connection with an example performed by a processor, such as processor 402. The method begins in step 205 and may proceed to optional step 210, optional step 215, or step 220.

At optional step 210, the processor may download from a network repository a first driver for communications with a first biometric device and/or a second driver for communications with a second biometric device. The network repository may comprise a server of a vendor/manufacturer of the first biometric device and/or the second biometric device. In one example, the first biometric device and the second biometric device are configured to communicate in different vendor formats. Thus, the biometrics hub (and the processor) may utilize different drivers to communicate with the different biometric devices.

At optional step 215, the processor may install (at the biometrics hub) the at least one of the first driver for communications with the first biometric device or the second driver for communications with the second biometric device that is downloaded at optional step 210. In one example, one of the first driver for communications with the first biometric device or the second driver for communications with the second biometric device may be downloaded from a network repository at optional step 210, while the other of the first driver or the second driver is pre-installed on the biometrics hub.

At step 220, the processor may establish a schedule for processing the at least one the first biometric data or the second biometric data. The schedule for processing the at least one the first biometric data or the second biometric data may define at least one of: a timing for transmitting the first biometric data or the second biometric to an authorized remote device, a timing for receiving the first biometric data from the first biometric device or for receiving the second biometric data from the second biometric device, a quantity of the first biometric data or the second biometric data to store at the biometrics hub, or a primary mode of communication for the transmitting of the first biometric data or the second biometric data to the authorized remote device. In one example, the schedule for processing the at least one the first biometric data or the second biometric data may also define one or more secondary/backup modes of communication, or an indication to not allow secondary modes of communication. For example, a biometric device may have non-critical biometric data. Thus, if a cellular mode of communication may be available via the biometrics hub, it may be used as a secondary mode of communication for some biometric devices, but may not be used for non-critical biometric data of other biometric devices in order to conserve power, bandwidth, etc.

In one example, the schedule is received from a device of a requesting entity, e.g., from a device of the user, from the authorized remote device, or from another authorized entity associated with the user or the authorized remote device, e.g., a doctor, a caregiver, an insurer, a healthcare data storage provider, a healthcare application provider, etc. In one example, step 220 may include establishing a second schedule for processing another of the first biometric data or the second biometric data, a third schedule for processing third biometric data from a third biometric device, and so forth, where the second schedule, the third schedule, etc., may be received from the same or a different entity as the first schedule. In one example, step 220 may include the processor negotiating a schedule with a device/entity requesting the schedule. For instance, the biometrics hub may not have sufficient storage capacity to accommodate the storage preferences of multiple requested schedules. Therefore, the processor may advise that it cannot accommodate a schedule and reject the schedule, or may request that the schedule be voluntarily changed to comply with the current capabilities of the biometrics hub, an authorization level or priority of the requesting entity, and so forth.

At step 225, establishes a session with a first biometric device. In one example, the session comprises a persistent session. In other words, a new session between the first biometric device and the biometrics hub does not need to be established each time the first biometric device has biometrics data to send.

At step 230, the processor receives first biometric data of a user from the first biometric device. The first biometric data may comprise measurements of various physical parameters of the user, such as: a heartrate, a breathing rate, a blood oxygen concentration, a blood sugar level, an electrocardiogram pattern, a pupil dilation, an activity level (e.g., a number of steps taken, a distance walked, run, swam, cycled, paddled, etc.), a skin conductance (e.g., indicative of skin moisture and/or sweat), a body temperature, a voice pitch, a voice tone, and so forth.

At step 235, the processor establishes a session with a second biometric device. In one example, the session comprises a persistent session. In other words, a new session between the second biometric device and the biometrics hub does not need to be established each time the second biometric device has biometrics data to send.

At step 240, the processor receives second biometric data of the user from the second biometric device. The second biometric data may comprise measurements of various physical parameters of the user, as described above in connection with the first biometric data that is received at step 230.

At step 245, the processor stores the first biometric data and the second biometric data at the biometrics hub. In one example, the first biometric data or the second biometric data is received and stored at the biometrics hub in accordance with the schedule for processing the at least one the first biometric data or the second biometric data that is established at optional step 220. For instance, the duration of the storage, the quantity of biometric data stored, and so forth, may be in accordance with the schedule. For example, the schedule may call for the biometrics hub to store the first biometric data for a time period of 12 hours after which the data may be flushed to allow storage of subsequent first biometric data from the first biometric device. In addition, in one example, the session with the first biometric device is maintained between transmission bursts of the first biometric data from the first biometric device to the biometrics hub, and the session with the second biometric device is maintained between transmission bursts of the second biometric data from the second biometric device to the biometrics hub. In other words, the sessions may comprise persistent sessions. Following step 245, the method may proceed to optional step 250, optional step 255, or step 260.

At optional step 250, the processor may receive a request for at least one of the first biometric data or the second biometric data from an authorized remote device. For instance, in one example the biometrics hub may be used as a backup source of the at least one of the first biometric data or the second biometric data. In one example, the authorized remote device may receive the at least one of the first biometric data or the second biometric data directly from the first biometric device and/or the second biometric device (e.g., without passing through the biometrics hub). However, if communications between the first biometric device and/or the second biometric device and the authorized remote device fails for any reason, the authorized remote device may request the first biometric data and/or the second biometric data from the biometrics hub.

At optional step 255, the processor may transmit the at least one of the first biometric data or the second biometric data to the authorized remote device in response to the request received at optional step 250 or in accordance with the schedule established at optional step 220. For instance, as mentioned above, a connection between the first biometric device and the authorized remote device or a connection between the second biometric device and the authorized remote device that does not include the biometrics hub may fail. Thus, the authorized remote device may request the first biometric data and/or second biometric data from the biometrics hub, in response to which the processor may transmit the first biometric data or the second biometric data to the authorized remote device. However, in another example, the transmitting at optional step 255 may be according to a schedule, which may indicate when to transmit the at least one of the first biometric data or the second biometric data to the authorized remote device, a quantity of the at least one of the first biometric data or the second biometric data, a (primary) communication mode to transmit the at least one of the first biometric data or the second biometric data, and so forth.

At step 260, the processor detects a power event associated with at least one of the first biometric device or the second biometric device. The detecting the power event may comprise: receiving an electronic warning message from a power distribution network indicating an upcoming loss of power from the power distribution network, detecting a loss of power at the biometrics hub from a power distribution network, detecting a loss of connectivity of a primary mode of communication of the biometrics hub, receiving a notification of a low battery from the at least one of the first biometric device or the second biometric device, and so forth. In one example, the first biometric device and/or the second biometric device remains in operation (or at least in partial operation) following the power event.

At step 265, the processor changes, in response to detecting the power event, a schedule for processing at least one of the first biometric data or the second biometric data. For example, the processor may reduce a frequency of communication of the first biometric data or the second biometric data from the at least one of the first biometric device or the second biometric device, decrease a frequency of measurement sampling of the at least one of the first biometric device or the second biometric device, or increase a storage duration or a storage quantity of the first biometric data or the second biometric data at the biometrics hub. In the first two cases, the processor may send an instruction to the first biometric device or the second biometric device to change behavior in accordance with the schedule change. In another example, the changing the schedule for processing the at least one of the first biometric data or the second biometric data in response to detecting the power event may comprise transmitting the at least one of the first biometric data or the second biometric data to the authorized remote device. For example, the schedule may call for sending the at least one of the first biometric data or the second biometric data to the authorized remote device at a later time. However, the power event may be a loss of power at the premises of the biometrics hub, and the biometrics hub may be utilizing a backup power source, or there may be an imminent loss of power for which the biometrics hub has received a notification. Thus, the processor may attempt to send all or as much of the stored biometric data as possible prior to a possible complete loss of power or total loss of connectivity. As mentioned above, the first biometric device and/or the second biometric device may remain in operation (or at least in partial operation) following the power event. In addition, in one example, the at least one of the first biometric device or the second biometric device may be powered by a backup power source following the power event. For instance, the power distribution network may comprise a primary power source for the at least one of the first biometric device or the second biometric device, while the first biometric device or the second biometric device may utilize an internal battery backup, an external battery backup, a generator, a solar panel/array, or the like as a secondary/backup power source.

In another example, the changing the schedule for processing the at least one of the first biometric data or the second biometric data in response to detecting the power event may comprise transmitting the first biometric data or the second biometric data to the authorized remote device via the biometrics hub, wherein prior to the power event, the at least one of the first biometric device or the second biometric device communicates the first biometric data or the second biometric data to the authorized remote device independent from the biometrics hub. In other words, the biometrics hub may comprise a backup storage. If the connectivity between the first biometric device or the second biometric device and the authorized remote device fails, the processor may then take over and begin transmitting to the authorized remote device. In one example, this may include using a different mode of communication. For instance, the first biometric device or the second biometric device may transmit the first biometric data or second biometric data, respectively, to the authorized remote device via a Wi-Fi connection to a router at the premises and via an ISP connection. However, the processor and the biometrics hub may utilize a cellular radio to transmit the at least one of the first biometric data or second biometric data to the authorized remote device via a cellular access network. In one example, the biometrics hub may be connected to a home gateway or a router for transmitting the first biometric data or the second biometric data to the authorized remote device, and may further include a cellular transceiver for transmitting the first biometric data or the second biometric data to the authorized remote device via a cellular link.

Following step 265, the method 200 may proceed to optional step 270, optional step 275, or to step 295.

At optional step 270, the processor may activate a backup power source for the at least one of the first biometric device or the second biometric device in response to detecting the power event. For instance, in one example, the backup power source may need to be turned on/activated in order to provide power to the at least one of the first biometric device or the second biometric device, such as a generator, a battery backup, etc. In one example, the backup power source may also power the biometrics hub when activated.

At optional step 275, the processor may send a notification of the power event to a user endpoint device of a user associated with the biometrics hub. In one example, the notification may also include a notification of the change in the schedule. In one example, the processor may receive an instruction from the user endpoint device in response to the notification. For instance, the user endpoint device may instruct the processor to further change the schedule. For example, the processor may automatically instruct one of the first biometric device or the second biometric device to change a measurement sampling interval. However, the user may prefer that the first biometric device or the second biometric device be taken completely offline to conserve additional bandwidth or power for other biometric devices, for instance. Following step 275, the method 200 may proceed to step 295 where the method 200 ends.

FIG. 3 illustrates a flowchart of an example method 300 for transmitting biometrics data to an authorized remote device in accordance with a schedule. In one example, steps, functions and/or operations of the method 300 may be performed by a biometrics hub, e.g., biometrics hub 166 in FIG. 1, or biometrics hub 166 in conjunction with other components of the system 100, such as gateway 111, and so forth. In one example, the steps, functions, or operations of method 300 may be performed by a computing device or system 400, and/or processor 402 as described in connection with FIG. 4 below. For example, the system 400 may represent a biometrics hub in accordance with the present disclosure. For illustrative purposes, the method 300 is described in greater detail below in connection with an example performed by a processor, such as processor 402. The method begins in step 305 and may proceed to optional step 310, optional step 315, or step 320.

At optional step 310, the processor may download from a network repository a first driver for communications with a first biometric device and/or a second driver for communications with a second biometric device. In one example, optional step 310 may comprise the same or similar operations as described above in connection with optional step 210 of the example method 200.

At optional step 315, the processor may install (at the biometrics hub) the at least one of the first driver for communications with the first biometric device or the second driver for communications with the second biometric device that is downloaded at optional step 310. In one example, optional step 315 may comprise the same or similar operations as described above in connection with optional step 215 of the example method 200.

At step 320, the processor establishes a first schedule for processing first biometric data of a user. The first biometric data of the user may be measured/generated by the first biometric device. In one example, the first schedule for processing the first biometric data of the user may define at least one of: a timing for transmitting the first biometric data to an authorized remote device, a timing for receiving the first biometric data from the first biometric device, a quantity of the first biometric to store at the biometrics hub, or a primary mode of communication for the transmitting of the first biometric data to the authorized remote device. In one example, the schedule for processing the at least one the first biometric data or the second biometric data may also define one or more secondary/backup modes of communication, or an indication to not allow secondary modes of communication. In one example, step 320 may comprise the same or similar operations as described above in connection with step 220 of the example method 200.

At step 325, the processor establishes a second schedule for processing second biometric data of the user. In one example, step 325 may comprise operations similar to those described in connection with step 320, and may comprise similar operations as described above in connection with step 220 of the example method 200. However, step 325 may relate to second biometric data of the user that is measured/generated by a second biometric device and may relate to a different type of physical parameter of the user than the first biometric data from the first biometric device. In one example, at least one of the first schedule or the second schedule is received from the authorized remote device. Alternatively, or in addition, at least one of the first schedule or the second schedule may be received from a device of the user. In addition, in one example, step 320 and/or step 325 may include the processor negotiating a schedule that is requested by the authorized remote device, by the device of the user, or by another entity.

At step 330, the processor stores the first biometric data that is received from the first biometric device via a first persistent session. For instance, the first persistent session with the first biometric device is maintained between transmission bursts of the first biometric data from the first biometric device to the biometrics hub. In one example, the first biometric data is stored at the biometrics hub in accordance with the first schedule.

At step 335, the processor stores the second biometric data that is received from the second biometric device via a second persistent session. For instance, the second persistent session with the second biometric device is maintained between transmission bursts of the second biometric data from the second biometric device to the biometrics hub. In one example, the second biometric data is stored at the biometrics hub in accordance with the second schedule.

In one example, the storing of the first biometric data at step 330 and the second biometric data at step 335 may comprise the same or similar operations as described above in connection with step 245 of the example method 200. In addition, in one example, the first biometric data and the second biometric data may comprises measurements of various physical parameters of the user, such as: a heartrate, a breathing rate, a blood oxygen concentration, a blood sugar level, an electrocardiogram pattern, a pupil dilation, an activity level (e.g., a number of steps taken, a distance walked, run, swam, cycled, paddled, etc.), a skin conductance (e.g., indicative of skin moisture and/or sweat), a body temperature, a voice pitch, a voice tone, and so forth.

At step 340, the processor transmits at least one of the first biometric data or the second biometric data to the authorized remote device in accordance with the first schedule or the second schedule. The transmitting at step 340 may include: establishing a session (e.g., a secure tunnel) with the authorized remote device, sending the at least one of the first biometric data or the second biometric data to the authorized remote device via the session with the authorized remote device, and closing the session with the authorized remote device. Following step 340, the method may proceed to optional step 345, optional step 360, or step 395.

At optional step 345, the processor may detect a power event associated with at least one of the first biometric device or the second biometric device. The detecting the power event may comprise: receiving an electronic warning message from a power distribution network indicating an upcoming loss of power from the power distribution network, detecting a loss of power at the biometrics hub from a power distribution network, detecting a loss of connectivity of a primary mode of communication of the biometrics hub, receiving a notification of a low battery from the at least one of the first biometric device or the second biometric device, and so forth. In one example, the first biometric device and/or the second biometric device remains in operation (or at least in partial operation) following the power event. In one example, optional step 345 may comprise the same or similar operations as described above in connection with step 260 of the example method 200. Following optional step 345, the method 300 may proceed to optional step 350, optional step 360, or step 395.

At optional step 350, the processor may send a notification of the power event to the authorized remote device. In one example, the notification may be sent via a backup/secondary mode of communication, or via a primary mode of communication and a backup/secondary mode of communication. For instance, the power event may be a loss of the primary mode of communication, e.g., a router failure, a connection failure to an ISP network, etc., or may be a loss of power that causes such components to fail. Accordingly, the use of the secondary mode of communication, or multiple modes of communication may help to ensure that the notification is received at the authorized remote device.

At optional step 355, the processor may receive an instruction from the authorized remote device to change at least one of the first schedule for processing the first biometric data or the second schedule for processing the second biometric data. The instruction to change the at least one of the first schedule or the second schedule may comprise an instruction to: change a frequency of transmitting the first biometric data or the second biometric data to the authorized remote device, increase a quantity of storage of the first biometric data or the second biometric data at the biometrics hub, decrease a frequency of measurement sampling of at least one of the first biometric data by the first biometric device or the second biometric data by the second biometric device, or change a frequency of sending the first biometric data by the first biometric device or the second biometric data by the second biometric device. In another example, the instruction to change the at least one of the first schedule or the second schedule comprises an instruction to change a mode of communication for transmitting the at least one of the first biometric data or the second biometric data to the authorized remote device. In one example, the processor may receive multiple instructions from the authorized remote device, such as: change a mode of communication in addition to changing a frequency of transmitting the first biometric data or the second biometric data to the authorized remote device.

At optional step 360, the processor may change at least one of the first schedule for processing the first biometric data or the second schedule for processing the second biometric data in response to the instruction received at optional step 355. In another example, the processor may change the at least one of the first schedule for processing the first biometric data or the second schedule for processing the second biometric data in response to detecting the power event. For instance, in one example, the notification sent at optional step 350 may include an indication of the change to be made to the at least one of the first schedule for processing the first biometric data or the second schedule for processing the second biometric data at optional step 360. For instance, the change to the at least one of the first schedule for processing the first biometric data or the second schedule for processing the second biometric data may comprise one of the same types of changes mentioned above in connection with optional step 355. However, in one example the processor may automatically determine the change, or may make the change according to the first schedule or the second schedule. For instance, the first schedule or the second schedule may define changes to be made with respect to a frequency of collection or transmission of biometric data, a timing of transmitting biometric data, etc., in response to power events, or different changes to be made in response to specific types of power events. Following optional step 360, the method 300 may proceed to optional step 365 or to step 395.

At optional step 365, the processor may transmit the at least one the first biometric data or the second biometric data to the authorized remote device in accordance with the first schedule or the second schedule that is changed. For instance, the processor may transmit the first biometric data or the second biometric data to the authorized remote device with an increased or decreased frequency, e.g., sessions for transmission bursts once every five minutes, sessions for transmission bursts once every 20 minutes, etc., with an increased or decreased data volume, e.g., transmitting five minute samples, versus 30 second samples, one minute samples, etc., and so on. Alternatively, or in addition, the processor may utilize a secondary mode of communication for transmitting the at least one of the first biometric data or the second biometric data to the authorized remote device, such as using a cellular connection instead of an ISP network connection via Wi-Fi. Following optional step 365, the method 300 may proceed to step 395. At step 395, the method 300 ends.

In addition, it should be noted that although not specifically specified, one or more steps, functions or operations of the method 200 or the method 300 may include a storing, displaying and/or outputting step as required for a particular application. In other words, any data, records, fields, and/or intermediate results discussed in the method 200 or the method 300 can be stored, displayed and/or outputted to another device as required for a particular application. Furthermore, steps or blocks in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or method 300 may comprise optional steps, or can be combined, separated, and/or performed in a different order from that described above, without departing from the example embodiments of the present disclosure.

Figure 4:
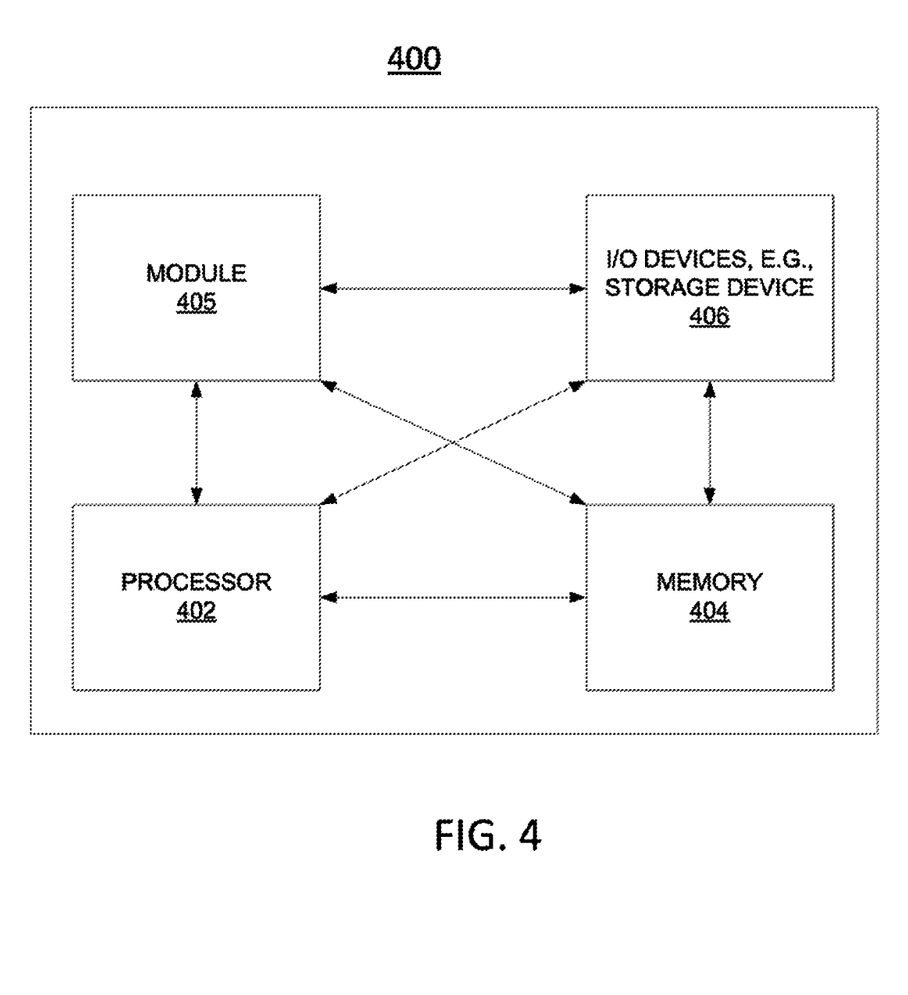
FIG. 4 illustrates an example high-level block diagram of a computer specifically programmed to perform the steps, functions, blocks, and/or operations described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for changing a schedule for processing biometrics data in response to detecting a power event and/or for transmitting biometrics data to an authorized remote device in accordance with a schedule, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 and/or the method 300 as discussed above is implemented in a distributed or parallel manner for a particular illustrative example, i.e., the steps of the above method 200 or method 300, or the entire method 200 or method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 and/or method 300. In one embodiment, instructions and data for the present module or process 405 for changing a schedule for processing biometrics data in response to detecting a power event and/or for transmitting biometrics data to an authorized remote device in accordance with a schedule (e.g., a software program comprising computer-executable instructions) can be loaded into memory 404 and executed by hardware processor element 402 to implement the steps, functions or operations as discussed above in connection with the illustrative method 200 and/or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for changing a schedule for processing biometrics data in response to detecting a power event and/or for transmitting biometrics data to an authorized remote device in accordance with a schedule (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:
1. A biometrics hub comprising:
a processor; and
a computer-readable medium storing instructions which, when executed by the processor, cause the processor to perform operations, the operations comprising:
establishing a session with a first biometric device;
receiving first biometric data of a user from the first biometric device;
establishing a session with a second biometric device;
receiving second biometric data of the user from the second biometric device;
storing the first biometric data and the second biometric data at the biometrics hub;
detecting a power event affecting at least one of: the first biometric device or the second biometric device; and changing, in response to the detecting the power event, a schedule for processing at least one of: the first biometric data or the second biometric data by the biometrics hub.

2. The biometrics hub of claim 1, wherein at least one of: the first biometric data or the second biometric data is received and stored at the biometrics hub in accordance with the schedule.

3. The biometrics hub of claim 1, wherein the operations further comprise:
transmitting the first biometric data or the second biometric data to an authorized remote device in accordance with the schedule.

4. The biometrics hub of claim 1, wherein the operations further comprise:
receiving a request for at least one of: the first biometric data or the second biometric data from an authorized remote device; and
transmitting the at least one of: the first biometric data or the second biometric data to the authorized remote device in response to the request.

5. The biometrics hub of claim 1, wherein the detecting the power event comprises at least one of:
receiving an electronic warning message from a power distribution network indicating an upcoming loss of power from the power distribution network;
detecting a loss of power at the biometrics hub from the power distribution network;
detecting a loss of connectivity of a primary mode of communication of the biometrics hub; or
receiving a notification of a low battery from the at least one of: the first biometric device or the second biometric device.

6. The biometrics hub of claim 1, wherein the operations further comprise:
activating a backup power source for the at least one of: the first biometric device or the second biometric device in response to the detecting the power event.

7. The biometrics hub of claim 1, wherein the changing the schedule for processing the at least one of: the first biometric data or the second biometric data in response to the detecting the power event further comprises:
reducing a frequency of communication of the first biometric data or the second biometric data from the at least one of: the first biometric device or the second biometric device.

8. The biometrics hub of claim 7, wherein the at least one of: the first biometric device or the second biometric device is powered by a backup power source following the power event.

9. The biometrics hub of claim 1, wherein the changing the schedule for processing the at least one of: the first biometric data or the second biometric data in response to the detecting the power event further comprises:
increasing a storage duration or a storage quantity of the first biometric data or the second biometric data at the biometrics hub.

10. The biometrics hub of claim 1, wherein the changing the schedule for processing the at least one of: the first biometric data or the second biometric data in response to the detecting the power event further comprises:
decreasing a frequency of a measurement sampling of the at least one of: the first biometric device or the second biometric device.

11. The biometrics hub of claim 1, wherein the biometrics hub is connected to a home gateway or a router for transmitting the first biometric data or the second biometric data to an authorized remote device.

12. The biometrics hub of claim 1, further comprising:
a cellular transceiver for transmitting the first biometric data or the second biometric data to an authorized remote device via a cellular link.

13. The biometrics hub of claim 1, wherein the operations further comprise:
installing at least one of: a first driver for communications with the first biometric device or a second driver for communications with the second biometric device, wherein the first biometric device and the second biometric device are configured to communicate in different vendor formats.

14. The biometrics hub of claim 13, wherein the operations further comprise:
downloading the at least one of: the first driver or the second driver from a network repository, wherein another of the first driver or the second driver is pre-installed on the biometrics hub.

15. The biometrics hub of claim 1, wherein the operations further comprise:
sending a notification of the power event to a user endpoint device of a user associated with the biometrics hub.

16. A non-transitory computer-readable medium storing instructions which, when executed by a processor of a biometrics hub, cause the processor to perform operations, the operations comprising:
establishing a session with a first biometric device;
receiving first biometric data of a user from the first biometric device;
establishing a session with a second biometric device;
receiving second biometric data of the user from the second biometric device;
storing the first biometric data and the second biometric data at the biometrics hub;
detecting a power event affecting at least one of: the first biometric device or the second biometric device; and
changing, in response to the detecting the power event, a schedule for processing at least one of: the first biometric data or the second biometric data by the biometrics hub.

17. A method comprising:
establishing, by a processor of a biometrics hub, a session with a first biometric device;
receiving, by the processor, first biometric data of a user from the first biometric device;
establishing, by the processor, a session with a second biometric device;
receiving, by the processor, second biometric data of the user from the second biometric device;
storing, by the processor, the first biometric data and the second biometric data at the biometrics hub;
detecting, by the processor, a power event affecting at least one of: the first biometric device or the second biometric device; and
changing, by the processor in response to the detecting the power event, a schedule for processing at least one of: the first biometric data or the second biometric data by the biometrics hub.

18. The method of claim 17, wherein the changing the schedule for processing the at least one of: the first biometric data or the second biometric data in response to the detecting the power event further comprises:

reducing a frequency of communication of the first biometric data or the second biometric data from the at least one of: the first biometric device or the second biometric device.

19. The method of claim 17, wherein the changing the schedule for processing the at least one of: the first biometric data or the second biometric data in response to the detecting the power event further comprises:
increasing a storage duration or a storage quantity of the first biometric data or the second biometric data at the biometrics hub.

20. The method of claim 17, wherein the changing the schedule for processing the at least one of: the first biometric data or the second biometric data in response to the detecting the power event further comprises:
decreasing a frequency of a measurement sampling of the at least one of: the first biometric device or the second biometric device.

* * * * *